Feb. 17, 1925.
M. L. LEVENE
1,526,753
ICE CREAM FORMER AND DISPENSER
Filed July 13, 1923
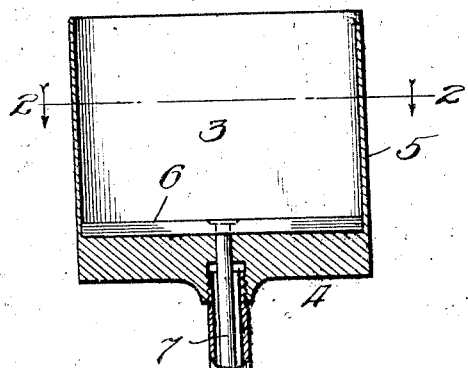
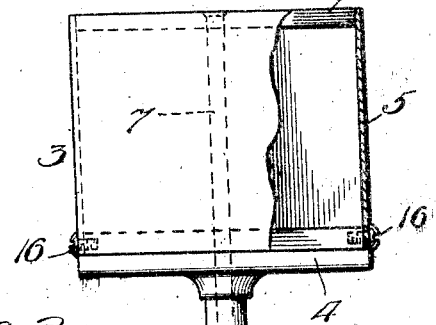
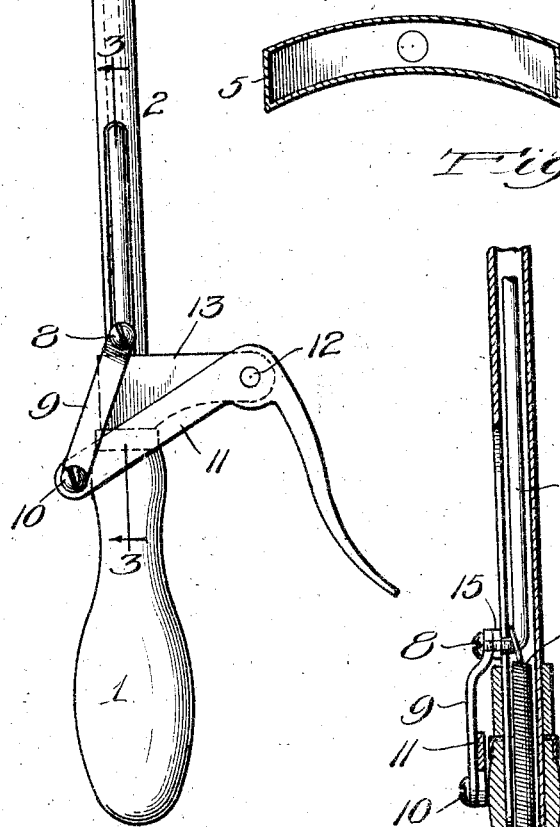
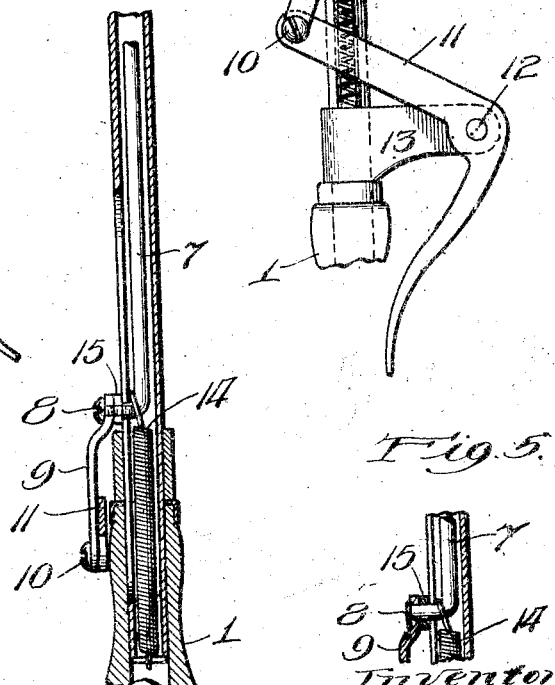
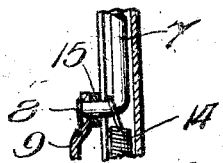
Inventor
Maurice L. Levene
by Wallace R. Lane
Attys.

Patented Feb. 17, 1925.

1,526,753

UNITED STATES PATENT OFFICE.

MAURICE L. LEVENE, OF CHICAGO, ILLINOIS.

ICE-CREAM FORMER AND DISPENSER.

Application filed July 13, 1923. Serial No. 651,247.

*To all whom it may concern:*

Be it known that I, MAURICE L. LEVENE, a citizen of the United States, residing at Chicago, Illinois, have invented a new and useful Ice-Cream Former and Dispenser, of which the following is a specification.

My present invention relates to that class of implements which are used to form, measure and dispense a confection such as ice cream and comprises among its objects the following: To produce an ice cream former and dispenser of such a shape that it will fit closely the side of an ice cream can of the usual size and shape; to produce an efficient and easily operated dispenser of the character described; to produce an implement of the character described which is easily disassembled and reassembled so that it may be readily cleaned out when necessary; to improve in general upon the construction of an implement of the character described; and such further objects, advantages and capabilities as will later more fully appear and as are inherent in the invention.

My invention further resides in the combination, construction and arrangement of parts illustrated in the accompanying drawing and, while I have shown therein a preferred embodiment and a modification thereof, I desire the same to be understood as illustrative only and not as limiting my invention.

Referring to the drawing annexed hereto and forming a part hereof, Fig. 1 is an elevation, partly in section, of one form of my present invention; Fig. 2 is a cross section substantially along the plane indicated by the line 2—2 Fig. 1; Fig. 3 is a broken section substantially along the plane indicated by the line 3—3 Fig. 1; Fig. 4 is a broken elevation of a modified form of my construction; Fig. 5 is a broken section substantially along the plane indicated by the line 5—5 Fig. 4.

Referring more in detail to the annexed drawing, numeral 1 designates the handle, 2 the shank, and 3 the head of my dispenser. The head 3 comprises a body portion 4 and a hollow extension 5 in which is located a reciprocable plunger 6 connected to one end of an actuating rod 7. The opposite end of the actuating rod is connected, pivotally, at 8 to a link 9 which is, in turn, pivotally connected at 10 with a bell crank lever 11. The latter is pivoted at 12 on a bracket 13 mounted upon the shaft or shank 2. Housed within the hollow handle and shank is a spring 14 which is connected to the rod 7 in such a way as to cause retraction of the same when force is removed from the bell crank 11. This returns the plunger 6 to the position shown in Fig. 1 so that the former and dispenser can be filled with ice cream or the like. When this has been filled as indicated, the bell crank is actuated to force the ice cream out and deliver the same where desired.

In the forms shown in Figs. 1, 2 and 3 the pivotal connection between rod 7 and link 9 is shown as a screw. Surrounding this is a washer 15 which separates the end of the link 9 from the end of the rod 7 which is bent over at right angles to the main portion thereof, as shown more clearly in Fig. 3. When it is desired to clean the implement shown in this figure, it is only necessary to remove the screw 8, thus making it possible to unhook the spring 14 from the end of the rod 7, which can then be taken out of the hollow shank 2 along with plunger 6. It will then be possible to scald out carefully the interior of the head 3 so that nothing will have an opportunity to sour therein. In the construction shown in Figs. 4 and 5 the same result is accomplished by removing the screws 16 sufficiently to enable the box 5 to be detached from the body 4. These parts can then be thoroughly scalded as in the other construction. In this construction the rod 7 is permanently connected at 8 to the link 9 and has permanently connected to it the spring 14, since it is unecessary to disconnect these parts at this point. The preferred form is shown as being curved to fit the wall of an ice cream can while the modification shown in Fig. 4 is illustrated as being flat. It will be understood that either of these forms may be made either flat or curved, as desired. These constructions are designed primarily for the forming and dispensing of ice cream for the making of ice cream sandwiches, though it will be understood that they are not confined in their untility to this use.

While I have shown and described herein what I now consider as a preferred form of my invention, I desire that it be understood that this disclosure is illustrative only and does not limit the scope of said invention.

Having now described my invention, I claim—

1. In an implement of the character described, a forming head which is hollow and has a handle secured thereto whereby it may be shoved endwise into a confection, said head having walls thereof shaped as a portion of a cylinder whose axis is substantially parallel to the direction of the length of the handle, and capable of forming a slab of the confection to be served.

2. A construction of the character described having a box open on one side and a plunger in said box fitting and longitudinally reciprocable therein, said box and plunger being arc-shaped in cross-section.

3. A construction of the character described having a box open on one side and a plunger in said box fitting and longitudinally reciprocable therein, said box and plunger being curved about an axis of curvature located outside the box but parallel to the box.

In witness whereof I hereunto subscribe my name to this specification.

MAURICE L. LEVENE.